April 16, 1940.　　　A. J. TOWNSEND　　　2,197,137
RAILWAY VEHICLE CONSTRUCTION
Filed July 27, 1937　　　4 Sheets-Sheet 1

April 16, 1940.    A. J. TOWNSEND    2,197,137
RAILWAY VEHICLE CONSTRUCTION
Filed July 27, 1937    4 Sheets-Sheet 2

INVENTOR
Albert J. Townsend
BY
Synnestvedt & Lechner
ATTORNEYS

Patented Apr. 16, 1940

2,197,137

UNITED STATES PATENT OFFICE 2,197,137

RAILWAY VEHICLE CONSTRUCTION

Albert J. Townsend, Lima, Ohio

Application July 27, 1937, Serial No. 155,861

24 Claims. (Cl. 105—174)

This invention relates to railway vehicle construction and particularly to locomotive trucks and their association with certain parts of the locomotive proper, the invention being especially directed to trucks having a plurality of axles, particularly those arranged for trailing operation beneath the locomotive fire-box. The objects and advantages of the invention will appear more clearly after a statement of the problems to be met in this art.

In connection with the recent trend of locomotive construction toward a sustained high draw-bar pull in high-speed operation, there is a tendency to substantially lengthen the fire-box and/or the secondary combustion chamber forming a part thereof, thus imposing increased burdens upon the trailer truck. In many cases, such locomotives are of large driving wheel diameter, making it desirable to employ a booster motor on the trailer truck for aiding the locomotive in starting trains which it can, however, readily keep moving at speed.

If excessive increase in weight per axle of the truck is to be avoided, it is necessary to employ multi-axle trailer trucks. The increased operating speeds also demand two or three or even more axles in the trucks, in order to obtain proper tracking and guiding functions, so as to minimize the loads on the individual wheels and their flanges and also to reduce the wear and tear on the track as well as the rolling stock and to minimize the risks of derailment. However, the increased length of truck construction, particularly of truck wheel-base, has necessitated the provision of a large degree of lateral-motion for the truck axle means toward the inner or front end of the truck, especially where the pivot point of the radial trailing truck is located well forwardly, as is customary, with the result that a heavy lateral hammering action is set up between the leading axle of the truck and the truck frame.

In addition to the foregoing, the increased length of fire-boxes and combustion chambers renders it difficult to secure sufficient space for all the associated parts, such as ash pan and hopper means, booster motor, weight-transmitting and/or truck centering bearings, equalizer mechanism and truck pivot mechanism.

The primary object of my present invention is to overcome difficulties such as the foregoing, and in general to provide a truck structure having a plurality of axles with improved riding, tracking and guiding action, and adapted at the same time to cooperate with the wheels in the main frame of the locomotive or other railway vehicle in the proper distribution of the superimposed weight, as well as to provide improved locomotive construction to co-operate with such trucks.

More specifically, the invention contemplates a truck construction having two or three or more axles which are preferably equalized together, independent of the axles in the main frame, there being interconnecting equalization means between the truck and the main driving axles, preferably acting through the intermediation of a lateral-motion bolster; the invention further contemplating a mounting of the truck pivot on said bolster, preferably in association with the equalizer means, as for example by utilizing a vertically-slidable non-weight-carrying truck pivot located on the bolster between a pair of equalizer devices.

Still further, the invention contemplates a truck of three or more axles, with a transom between axles adapted to receive the bolster, and a locomotive main frame extension or cradle having transverse braces in the region of the truck bolster and adapted to cooperate with the truck pivot and equalizer means in a manner to maintain them in proper position while at the same time strengthening said main frame extension (which carries the loads of pull and buff) and also leaving clear space for the ash pan means. In pursuance of this, the invention involves certain novel truck and main frame members, particularly formed as integral castings.

The invention further involves locating the truck pivot means forwardly of the center of the truck wheel-base, and preferably in between an intermediate truck axle and a forward truck axle; providing truck axle means rearward of the fire-box ash pan hopper mechanism, locating the mechanism for transmitting weight to the truck forwardly and rearwardly of the ash pan and hopper means; locating booster motor mechanism rearward of the rear axle means of the truck and rearward of the ash pan mechanism; and arranging at least a pair of truck axles forwardly of the ash pan, with the truck pivot and/or bolster and/or equalizing mechanism adjacent the forward end of the truck, preferably between the first and second axles thereof and below the combustion chamber, forwardly of the ash pan.

Still more specifically, the invention contemplates truck arrangements of the character above mentioned, in which intermediate axle means of the truck, particularly where the truck structure is of substantial wheel-base, are provided with freedom for lateral-motion somewhat greater than a mere working clearance, the forward and rear axles of the truck (which have the major guiding and tracking functions) being maintained with only normal clearance, this arrangement being preferably associated with a truck pivot mechanism located forwardly of the center of the truck wheel-base, and more particularly intermediate the first and second axles, said pivot being mounted for yieldingly-resisted lateral-motion, especially by a weight-resisted lateral-motion mounting, so that, in curving, the truck partakes partially of a radial action and partially of a swiveling action, the axle means forwardly of the pivot swinging laterally in one direction for a given curve and the axle means rearwardly thereof swinging in the other lateral direction. In association with such arrangement, the invention contemplates not only a centering action at the truck pivot but also weight supporting bearing means adjacent the rear end of the truck, preferably also adapted for truck centering action. Detailed structural advantages are also involved.

How the foregoing objects and advantages, together with such others as are incident to the invention, are secured, will be evident from the following description, taken together with the accompanying drawings, wherein.

Figures 1, 2:
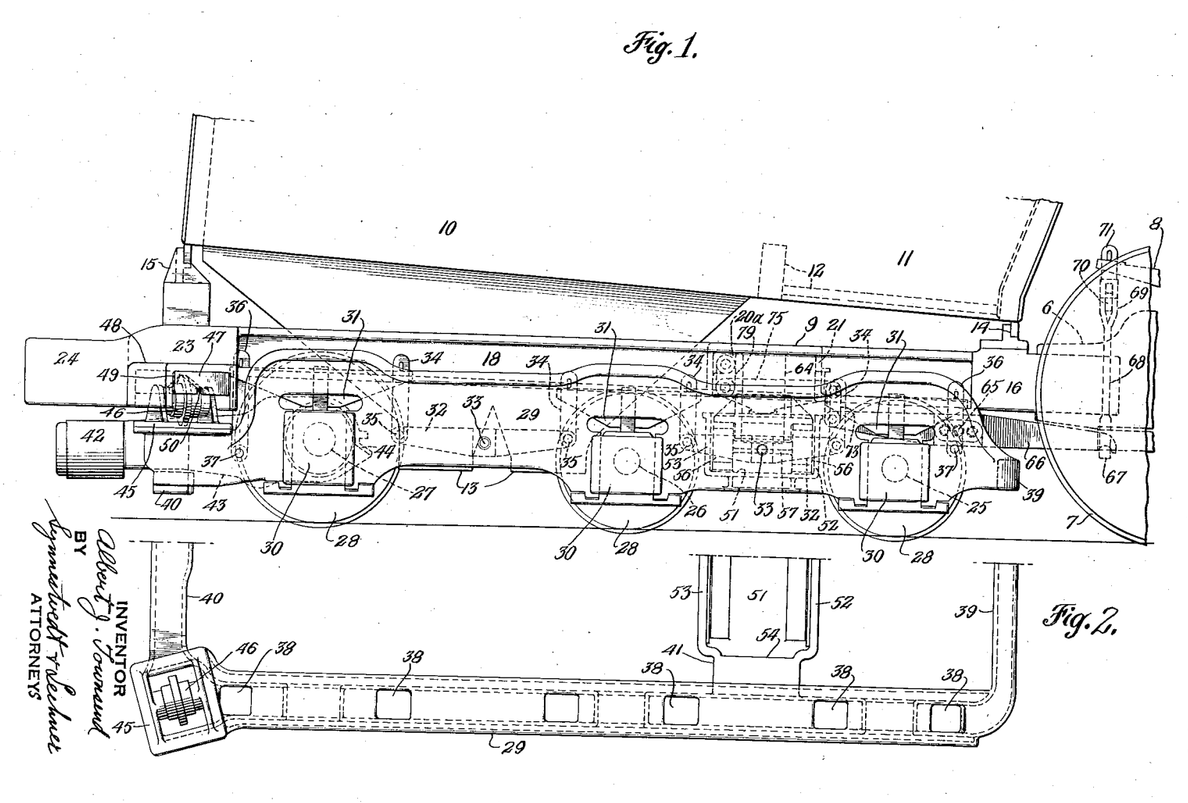
Figure 1 is a fragmentary side elevational view of the rear end of a locomotive, embodying the preferred form of the present invention, and illustrating a three axle truck.
Figure 2 is a half plan view of the truck frame, showing one of the rear side weight-receiving bearing devices.

By reference to Figure 1 it will be seen that the locomotive construction comprises a main frame 6 with driving wheels 7, the axles of which (not shown) are journalled in said frame, springs 8 for the driving wheels, one of which is fragmentarily illustrated, a main frame extension or cradle 9, a fire-box 10 having a forward extension or secondary combustion chamber 11, which latter may be partially lined with fire brick indicated at 12, ash pan hopper mechanism 13, and furnace bearer means 14, 15. The rear end extension 9 may be formed integrally with the main frame 6, or may (as shown in Figures 1 and 3 to 5) be formed as a separate casting, with a forward box-like portion 16 fitting into the tail end of the main frame member 6 and apertured at 17 to pass the hangers or links of the spring rigging.

In either event, i. e., whether the main frame extension is solid with the major portion of the main frame or separately secured thereto, I prefer to cast the same with integral longitudinal members 18, one at either side and inside the planes of the truck wheels, an integral cross member 19 carrying equalizer fulcrum brackets 20, an integral cross bracing structure 21, 21 apertured at 22 to pass the equalizers and having equalizer fulcrum brackets 20a, an integral rear cross beam 23, and an integral rear draft gear pocket 24, so that a unified rigid structure is provided to transmit the draft longitudinally, to support and position certain of the equalizer and truck parts, and to transmit the weight to the truck in the manner hereinafter to be described.

The truck of the present invention is in this embodiment located beneath the cradle or frame structure just described, and comprises a plurality of axles, for example front, intermediate and rear axles 25, 26 and 27, with wheels 28, said axles being journalled in the side members 29 of the truck frame in any convenient manner, as by means of the journal boxes 30 which are vertically slidable in guideways or pedestal jaws. Said side frame members may be made of hollow box section as shown, so as to receive the spring rigging of the truck axles, which are equalized together independently on each side. This truck spring rigging comprises a leaf spring 31 over each journal box and seated thereon, a plurality of equalizers 32 each located between two adjacent axles and pivoted in the side frame member at 33, equalizer hangers 34 suspended from said springs and pivoted at 35 to the equalizer bars, and forward and rearward end links 36 pivotally connected to the side frame members at 37. The truck side frame members 29 are apertured at 38, 38, to clear certain equalizer parts.

The frame structure of the truck is preferably formed integrally with three cross members, a front member or transom 39 (see Figure 2), a rear member or transom 40, and an intermediate transom structure 41 located toward the forward end, preferably between the first and second axles.

The rear transom 40 is adapted to support a booster motor comprising cylinders 42 and a casing or motor frame 43, which at its forward end 44 is journalled on the rear axle 27, in position for said axle to be driven at will by said motor. The rear truck transom also serves as an integral brace for the side frame members for the support of bracket devices 45 at the rear corners of the truck, said devices serving to rotatably mount the weight-receiving rollers 46 which take superstructure weight from a pad member 47 seated in a bracket 48 of the cradle. Slight clearance for longitudinal movement is provided at 49 between the pad 47 and bracket 48, said pad having limited longitudinal movement with the truck frame, but being fixed against transverse movement, so that as the truck frame moves laterally the inclined bottom faces 50 of the pads 47 tend to center the truck by virtue of the imposed weight. Further description of the details of the roller and inclined pad devices is unnecessary, as these may take other forms or may be superseded by other weight-transmitting means such as centering rockers, and the like, such as are known in this art.

Figure 3:
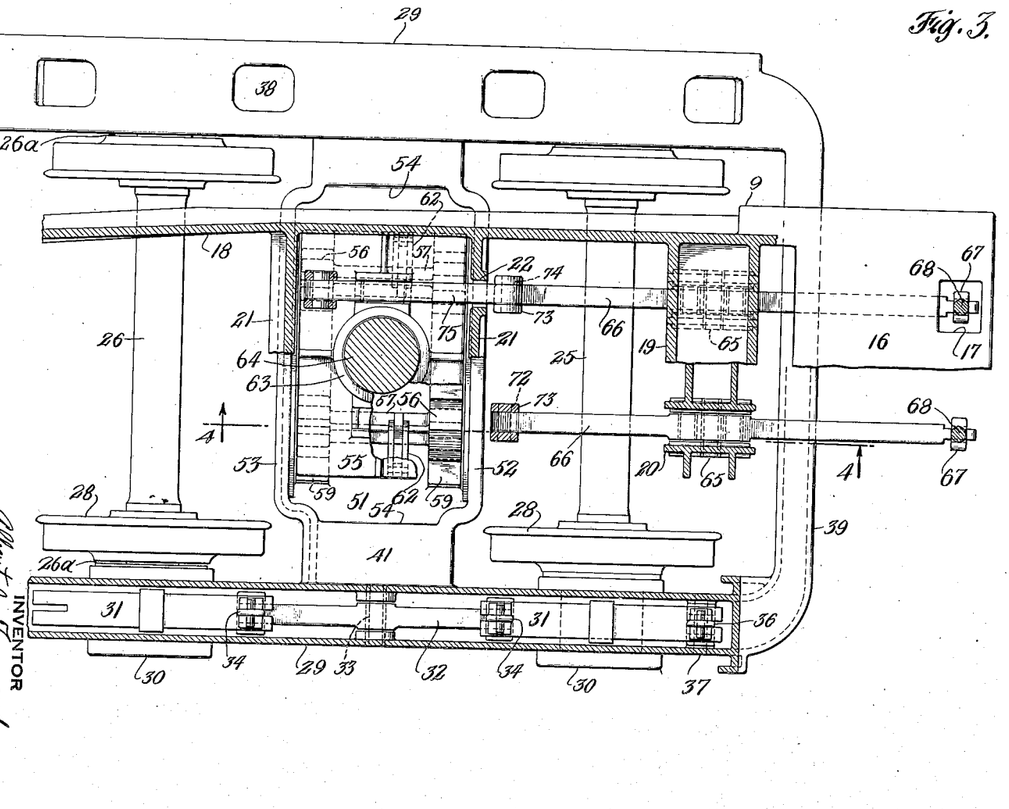
Figure 3 is a plan view of the front portion of the truck, drawn to a larger scale, showing certain parts in section, including parts of the pivot mechanism and equalizer mechanism, and also fragmentarily illustrating a part of my improved locomotive main frame rear end extension or cradle, this view being taken approximately on the irregular line 3—3 of Figure 5.
Figure 4:
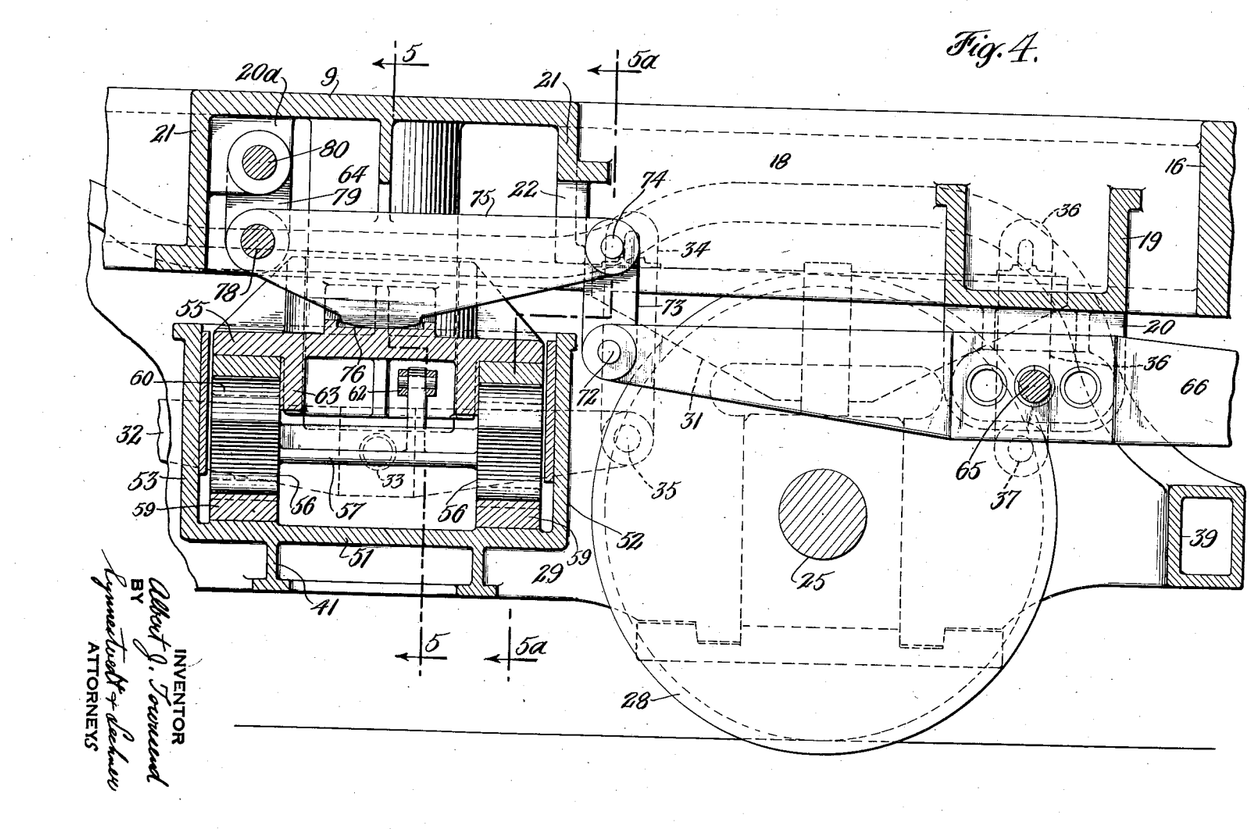
Figure 4 is a still further enlarged longitudinal vertical section taken on the line 4—4 of Figure 3 and illustrating various of the equalizer parts in elevation.
Figure 5:
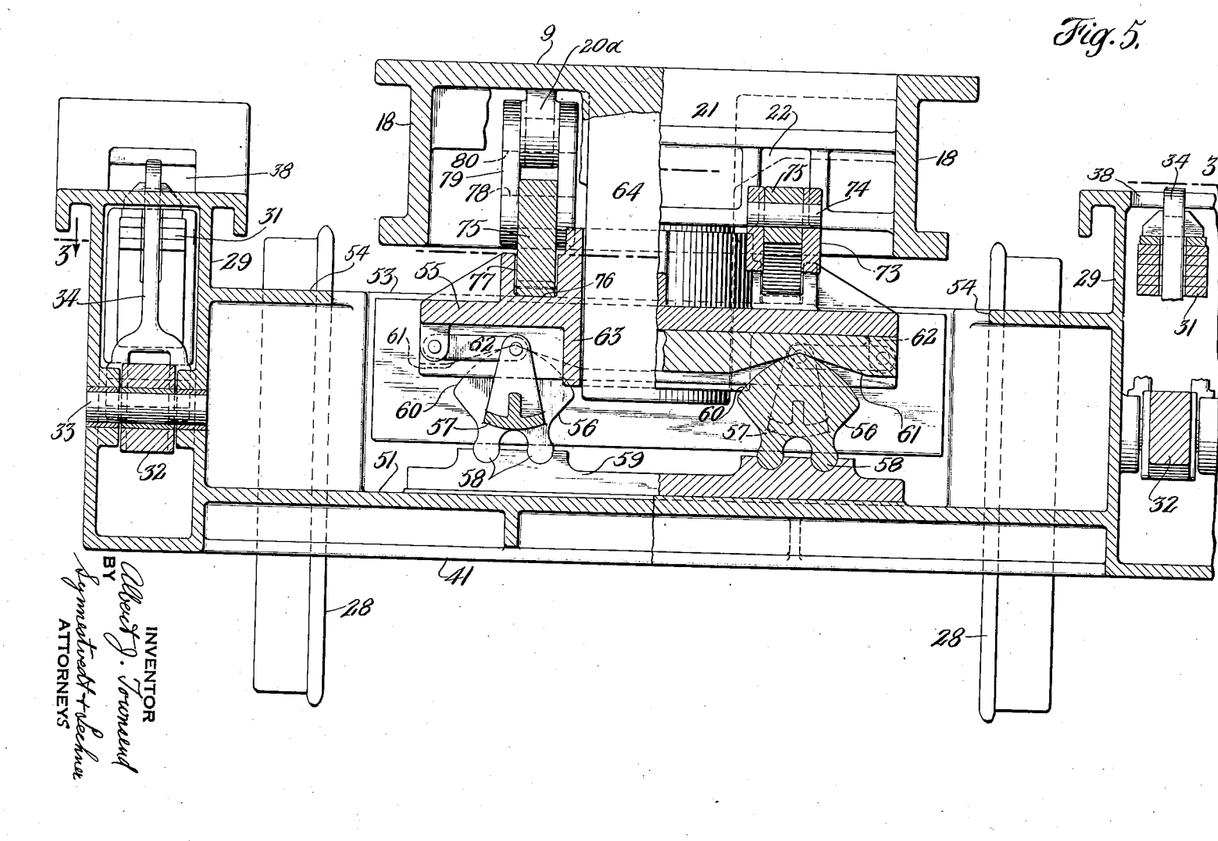
Figure 5 is a broken transverse section, the left-hand half of which is taken approximately on the line 5—5 of Figure 4 and the right-hand half of which is taken approximately on the line 5a—5a of Figure 4.

Turning now to Figures 3 to 5 inclusive, it will be noted that the intermediate truck transom 41 is of substantial vertical depth and is provided with a large recess or pocket, formed with a bottom floor 51, front and rear walls 52, 53, and bracing webs 54, this recess being adapted to receive a lateral-motion bolster 55.

The bolster bears upon the bottom floor of the transom recess through the intermediation of a pair of double rockers 56, the two rocker members of each pair being connected by an integral web construction 57. Each rocker member may have a couple of arcuate feet 58 for seating in corresponding grooves or sockets in the supporting pads 59, and has arcuate upper surfaces 60 adapted to cooperate with inclined faces 61 on the bottom of the bolster, so that lateral-motion of the bolster is yieldingly resisted by the weight imposed thereon. Positioning links 62 are pivotally connected to the bolster and to the rockers.

The bolster 55 constitutes both a pivot-carrying member and a weight-receiving member for the truck, although in the preferred embodiment the weight is not transmitted to the truck through the pivot means. For purposes of pivotation the bolster has a vertical cylindrical pivot wall 63 which rotatably and slidably receives the pivot member 64 which is formed integrally with the main frame or cradle structure 9. Sufficient clearance is provided between the inner periphery of the pivot member 63 and the outer periphery of the pivot member 64 to permit not only a relative vertical sliding motion but also the requisite slight angling or "cocking" which occurs upon lateral movement of the truck, due to the action of the weight-centered rollers at the rear end of the truck and rockers beneath the bolster. The location of this bolster and pivot assembly toward one end of the truck, and particularly toward the forward end, and especially between the end and intermediate axle means, results in retaining something of a radial truck action, while at the same time permitting the truck frame to swivel and to move laterally in a manner to accommodate the truck most readily to track curvature and rail inequalities, and renders unnecessary the provision of excessive freedom for lateral-motion of the front and rear axles. In fact, nothing more than normal working clearances between the axles and the truck frame is ordinarily required with this truck, although if the truck be of unusually long wheel-base, the intermediate axle means may be given something more than a working clearance, as indicated at 26a (Figure 3) between the wheel hubs and liners of the middle axle 26.

Superstructure weight is transmitted to the truck adjacent its forward end by means of equalizer mechanism rockingly bearing upon the bolster, at each side of the truck pivot, and preferably closely adjacent thereto, so that a minimum of motion is imposed upon the equalizer mechanism by pivotation between the bolster and the pivot pin 64. The equalizing mechanism referred to is preferably arranged to interconnect the truck (through the medium of the bolster) and the spring rigging and equalizing system of the main driving wheels, and is desirably of a compound lever type, as will now be described.

In the bracket members 20 of the cradle 9 there are pivoted, respectively at 65, 65, a pair of longitudinally extending equalizer bars 66. At the forward ends (as best seen in Figures 1 and 3) these equalizer bars seat in or rest upon the slotted bottom yokes 67 of the hanger members 68, which latter pass upwardly through the apertures 17 of the cradle structure 16, and have their upper yokes 69 pivoted upon a transverse equalizer bar 70, the bar 70 being connected at its outer ends by links 71 to the rear ends of the rear driving wheel springs 8.

At their rear ends, the equalizer bars 66 are pivoted at 72 to the lower ends of links 73 which in turn have their upper ends pivotally connected at 74 to the forward ends of equalizer bars 75 which extend through the slots 22 in the cradle structure and which have rocking seats intermediate their ends, at 76, bearing upon the bolster 55, in recesses or sockets 77 provided for that purpose at each side of the pivot center. The rear ends of the equalizer bars 75 are pivotally connected at 78 to the lower ends of vertical links 79, which latter have their upper ends pivoted at 80 upon the brackets 20a formed in the cradle structure 9.

It will be seen that the superstructure weight imposed upon the equalizer bars 66 by means of brackets 20 and pivot pin 65, and imposed upon the equalizer bars 75 by means of brackets 20a, pivots 80, links 79, and pivot 78, is borne partly by the truck, by means of the bearing of equalizers 75 on the bolster, and partly by the driving wheels, by means of the connection of the forward ends of equalizer members 66 to the spring rigging of the driving wheels. For example, an irregularity in the track tending to raise the truck wheels 28 (see Figure 4) tends to raise the equalizer bars 75 about their pivots 78, which in turn tends to raise the rear ends of equalizer bars 66, thus lowering the forward ends of the latter, so as to impose part of the load on the driving wheel springs 8; and the reverse occurs when the rear driving wheels tend to rise over an irregularity in the track.

It will futher be seen that, regardless of the pivoting of the truck about the pivot pin 64, or the lateral-motion of the truck frame relative to the bolster, with resultant rocking of the truck, the equalizer mechanism and main spring rigging undergoes little or no distortion from its predetermined vertical longitudinal plane, since the equalizer bars 66 are mounted in the main frame structure and the equalizer bars 75 are associated also with said structure and with the bolster close to the pivot center. In short, the interequalizer system between the truck and the main spring rigging of the locomotive is substantially independent of the major pivotal and lateral-motions of the truck frame. At the same time, such slight longitudinal motions as are imposed upon the equalizer bars 75 by the pivotal movements of the truck are accommodated by the linkage 73, 79 and the rocking bearing 76 upon the bolster. Further, the use of a compound lever arrangement for the equalizing interconnection between the truck and the axles of the main frame has the advantage of greater freedom for the designer in the variation of the relative load to be carried by the driving wheels and the truck wheels.

As to a number of the features hereinbefore described there is a co-ordination of arrangement and operation which may here be summarized.

The pivot device and the associated lateral motion device together constitute a mounting assembly for operatively connecting the truck to the main frame and for transmitting thereto the tractive thrust produced by the motor on the truck, and although in this embodiment the pivot itself is free of the superimposed weight, yet an element of said assembly (in this case the bolster) receives weight from the equalizer bar means in a manner to effect a centering action. Since said assembly is located in a region between the main wheel-base and at least a majority of the truck axles, the pivoted rigid equalizer bars can be made relatively short (as shown); and further, the said assembly adjacent the inner end of the truck thus acts in combination with the two outer-end weight-actuated centering bearings to provide weight-restored bodily lateral movement of the truck frame as an entirety, to the extent demanded by track conditions.

It will now be quite clear how the objects and advantages set forth at the beginning of this specification are secured, particularly the improved guiding and tracking qualities of the truck, due to better distribution of the lateral thrusts on the flanges of the several wheels and better equalization of weight, improved utilization of space, by locating the major parts of the bolster, pivot, and equalizer mechanism beneath the secondary combustion chamber and forward of the ash pan means, the downward extension of said ash pan means between the rear and intermediate truck axles and mid-way of the longitudinal members of the cradle which carry the pull and buff, and the location of the booster motor and rear end weight-transmitting bearings back of the ash pan means and of the rear truck axle. It will further be seen that by the elimination of the usual radius bar and radial pivot mechanism common to trailer trucks, and the location of the truck pivot with its lateral motion bolster rearward of the first axle of the truck, it is possible to bring the front end of the truck much closer to the rear driving wheels, with resultant minimization of the required degree of lateral swinging of the truck frame, and permitting also the use of a multi-axle truck of considerable length, without exceeding over-all locomotive wheel-base limitations.

All of the foregoing is in marked contrast with the known art in the field of multi-axle trailer trucks, which are commonly of the true "radial" type, wherein the rear end of the truck must necessarily swing laterally to an excessive degree, wherein the front axle means of the truck must be provided with excessive freedom for lateral motion in the truck frame (thus detrimentally affecting the guiding and tracking qualities of the truck wheels), and wherein the equalizer mechanism between the truck axles, at each side of the truck, is ordinarily coupled up directly to the main spring rigging, and connected thereto by equalizer bars which swing laterally with the truck frame and thus distort the spring rigging system. These and other difficulties of the prior art are minimized by the present invention.

I claim:

1. In a locomotive having a main frame with wheel and axle means journalled therein and a fire-box carried thereon with ash pan hopper means below said fire-box, a trailer truck beneath the fire-box having axle means rearward of an ash pan hopper and having a pair of axles forwardly of said ash pan hopper, and a truck pivot between the axles of said pair with means providing for lateral motion of the truck at said pivot.

2. In a locomotive having a main frame with wheel and axle means journalled therein and a fire-box carried thereon with ash pan hopper means below said fire-box, a trailer truck beneath the fire-box having axle means rearward of an ash pan hopper and having a pair of axles forwardly of said ash pan hopper, a truck pivot between the axles of said pair, and means providing for lateral-motion between the truck and the pivot center.

3. In a locomotive having a main frame with wheel and axle means journalled therein and a fire-box carried thereon with ash pan hopper means below said fire-box, a trailer truck beneath the fire-box having axle means rearward of an ash pan hopper and having a pair of axles forwardly of said ash pan hopper, a truck pivot between the axles of said pair with means providing for lateral motion of the truck at said pivot, and equalizer mechanism between the truck and the axle means of the main frame.

4. In a locomotive having a main frame with wheel and axle means journalled therein and a fire-box carried thereon with ash pan hopper means below said fire-box, a trailer truck beneath the fire-box having axle means rearward of an ash pan hopper and having a pair of axles forwardly of said ash pan hopper, a truck pivot between the axles of said pair with means providing for lateral motion of the truck at said pivot, and equalizer mechanism between the truck and the axle means of the main frame, and weight-transmitting means between the main frame and the truck rearward of said rear axle means.

5. In a locomotive having a main frame with wheel and axle means journalled therein and a fire-box carried thereon with ash pan hopper means below said fire-box, a trailer truck beneath the fire-box having axle means rearward of an ash pan hopper and having a pair of axles forwardly of said ash pan hopper, a truck pivot between the axles of said pair with means providing for lateral motion of the truck at said pivot, and weight-transmitting means between the main frame and the truck rearward of said rear axle means.

6. In a locomotive having adjacent its rear end a fire-box and secondary combustion chamber and main driving wheels forwardly thereof, a truck having a plurality of wheeled axles positioned beneath said fire-box and combustion chamber, and a truck pivot device located between truck axles forwardly of the center of the truck wheel-base and beneath said combustion chamber, said truck thus being located in close proximity to the main driving wheels and in position to carry weight of said rear end of the locomotive.

7. In a locomotive having adjacent its rear end a fire-box and secondary combustion chamber and main driving wheels forwardly thereof with an ash pan beneath said fire-box rearwardly of said chamber, a truck having a plurality of wheeled axles positioned beneath said fire-box and combustion chamber, and a truck pivot device located between truck axles forwardly of the center of the truck wheel base beneath said combustion chamber and ahead of said ash pan, said truck thus being located in close proximity to the main driving wheels and in position to carry weight of said rear end of the locomotive, while leaving clearance for said ashpan rearwardly of the pivot device.

8. A locomotive frame casting comprising laterally spaced-apart longitudinal members providing a clear zone between them for ash pan means, draft gear pocket construction joining said members at their rear ends, transverse bracing means forward of the ash pan zone in position to overlie a trailer truck bolster and having a pivot member adapted to cooperate with a truck bolster pivot, and additional transverse bracing positioned ahead of said first-mentioned bracing means and there carrying fulcrum brackets for truck equalizers.

9. For a locomotive, a trailer truck with a plurality of wheeled axles, the intermediate axle means of the truck being provided with means for lateral-motion more than a working clearance, a pivot for the truck located forwardly of said axle means and having a lateral-motion mounting with respect to the truck, and weight-carrying means adjacent both ends of the truck tending to center the truck with respect to the said pivot.

10. A railway truck frame having side members each with pedestals for at least three axles, bearing means adjacent one end of the frame at each side thereof for receiving superimposed weight, and transom between the pedestals at the opposite end of the frame and the next adjacent pedestals and configured to receive a lateral-motion bolster.

11. A railway truck frame having side members each with pedestals for at least three axles, bearing means adjacent one end of the frame at each side thereof for receiving superimposed weight, a transom between the pedestals at the opposite end of the frame and the next adjacent pedestals and configured to receive a lateral-motion bolster, and end transom means adapted to support a booster motor adjacent the first-mentioned end of the frame.

12. An integral truck frame casting comprising side members formed with at least three pairs of pedestals, each pair adapted to receive an axle, a transom between one end pair of pedestals and the next adjacent pair and configured to receive a lateral-motion bolster, and weight-supporting bearing means adjacent the opposite end of the frame at each side thereof outside the plane of the wheels.

13. In railway vehicle truck construction, a truck frame journaling at least three axles, a lateral-motion bolster mounted in the frame adjacent an end thereof and carrying a truck pivot, said pivot being vertically movable at a fixed axis relative to the vehicle proper, equalizer mechanism bearing upon said bolster to transmit weight thereto, and other weight-bearing means on said truck adjacent the opposite end thereof.

14. In a steam locomotive having main framing, driving wheels mounted therein and a fire-box extending rearwardly from the region of the driving wheels, a trailing truck beneath the main framing in the region of the fire-box, said truck comprising a truck frame with its front end in close juxtaposition to the rear drivers and having at least three truck axles, equalizer mechanism positioned in the space between the rear driver axle and the first truck axle, truck pivot means operatively associated with said main framing and positioned in the space between the first and second truck axles, and ash pan means cooperating with said fire-box and positioned in the space between the second and third truck axles.

15. In a locomotive having main framing and driving wheels journalled therein to constitute the main wheelbase, a truck positioned beyond one end of said wheelbase and comprising a truck frame with at least three axles journalled therein, a pivot device for the truck located between an end axle thereof and an adjacent truck axle and cooperating with the locomotive main framing at a substantially fixed pivot center with respect to said framing, a lateral-motion mounting for the pivot device in said truck to accommodate lateral motion of the truck frame relative to said pivot and the main framing, and weight-bearing means on the truck longitudinally removed from said pivot toward the opposite end of the truck and adapted to receive weight from said main framing.

16. In a railway vehicle having a main frame structure with wheeled axle means journalled therein to constitute a main wheel-base, a truck positioned at an end of said main wheel-base and comprising a frame and a plurality of wheeled axles, equalizer means distributing the load on the truck wheels among the several axles thereof independently of the axle means in said main frame, a mounting assembly for operatively connecting the truck to said main frame, including a vertical pivot device and a lateral-motion device associated therewith, said assembly being located in a region between said main wheel-base and at least a majority of the truck axles, and equalizer mechanism extending from said assembly to said main wheel-base and coupled to distribute weight from said main frame to axle means thereof and to the truck through an element of said assembly.

17. In a railway vehicle having a main frame structure with wheeled axle means journalled therein to constitute a main wheel-base, a truck positioned at an end of said main wheel-base and comprising a frame and a plurality of wheeled axles, equalizer means distributing the load on the truck wheels among the several axles thereof independently of the axle means in said main frame, a vertical pivot for longitudinally positioning the truck with relation to said main frame, a lateral-motion device mounting said pivot on the truck frame in a region between said main wheel-base and at least a majority of the truck axles, and equalizer mechanism extending from the lateral-motion device to said main wheel-base and coupled to distribute weight from said main frame to axle means thereof and to the lateral-motion device on the truck.

18. In a railway vehicle having a main frame structure with wheeled axle means journalled therein to constitute a main wheel-base, a truck positioned at an end of said main wheel-base and comprising a frame and a plurality of wheeled axles, equalizer means distributing the load on the truck wheels among the several axles thereof independently of the axle means in said main frame, a mounting assembly for operatively connecting the truck to said main frame, including a vertical pivot device and a lateral-motion device associated therewith, said assembly being located in a region between said main wheel-base and at least a majority of the truck axles, and equalizer mechanism extending from said assembly to said main wheel-base and coupled to distribute weight from said main frame to axle means thereof and to the truck through an element of said assembly, and other weight-transmitting means interposed between said main frame and the truck frame adjacent the end of the latter remote from said main wheel-base.

19. In a railway vehicle having a main frame structure with wheeled axle means journalled therein to constitute a main wheel-base, a truck positioned at an end of said main wheel-base and comprising a frame and a plurality of wheeled axles, a mounting assembly for operatively connecting the truck to said main frame, including a vertical pivot device and a lateral-motion device associated therewith, said assembly being located in a region between said main wheel-base and at least a majority of the truck axles, and pivoted rigid equalizer bar means extending from said assembly to said main wheel-base, being coupled to distribute weight from said main frame to axle means thereof and being rockingly seated upon an element of said assembly to distribute weight to the truck.

20. In a railway vehicle having a main frame structure with wheeled axle means journalled therein to constitute a main wheel-base, a truck positioned at an end of said main wheel-base and comprising a frame and a plurality of wheeled axles, a vertical pivot for longitudinally positioning the truck with relation to said main frame, a weight-restored lateral-motion bolster mounting said pivot on the truck frame in a region between said main wheel-base and at least a majority of the truck axles, equalizer mechanism extending from said bolster to said main wheel-base and coupled to distribute weight from said main frame to axle means thereof and to the lateral-motion bolster on the truck, and weight-actuated yielding centering means transmitting weight from said main frame to the truck frame adjacent the outer end thereof.

21. In a railway vehicle having a main frame structure with wheeled axle means journalled therein to constitute a main wheel-base, a truck positioned at an end of said main wheel-base and comprising a frame and a plurality of wheeled axles, a weight-restored lateral-motion bolster mounted on the truck frame in a region between said main wheel-base and at least a majority of the truck axles, equalizer mechanism extending from said bolster to said main wheel-base and coupled to distribute weight of said main frame to axle means thereof and to said bolster on the truck, and weight-actuated yielding centering means transmitting weight from said main frame to the truck frame adjacent the outer end thereof, the latter means being operative in combination with said bolster and equalizer mechanism to provide weight-restored bodily lateral movement of the truck frame as an entirety.

22. For a railway vehicle, a truck comprising a frame journalling a plurality of wheeled axles, mechanism for transmitting vehicle weight to the truck including weight-actuated yielding centering means adjacent each end thereof, and mechanism for operatively coupling the truck to the vehicle with freedom for bodily lateral movement of the truck frame as an entirety including a weight-free pivot device adapted to fix the position of the truck longitudinally.

23. For a railway vehicle, a truck comprising a frame journalling a plurality of wheeled axles, mechanism for transmitting vehicle weight to the truck including weight-actuated yielding centering means adjacent each end thereof, and mechanism for operatively coupling the truck to the vehicle with freedom for bodily lateral movement of the truck frame as an entirety including a weight-free pivot device located adjacent one end of the truck and adapted to fix the position of the truck longitudinally.

24. For a railway vehicle, a truck comprising a frame journalling a plurality of wheeled axles, mechanism for transmitting vehicle weight to the truck including weight-actuated yielding centering means adjacent each end thereof, a driving motor on the truck, and mechanism for operatively coupling the truck to the vehicle with freedom for bodily lateral movement of the truck frame as an entirety including a weight-free pivot device constructed to transmit to the vehicle proper the tractive thrust produced by said motor on the truck.

ALBERT J. TOWNSEND.

CERTIFICATE OF CORRECTION.

Patent No. 2,197,137. April 16, 1940.

ALBERT J. TOWNSEND.

It is hereby certified that error appears in the printed specification of the above numbered patent requiring correction as follows: Page 4, second column, line 54, claim 7, strike out the words "and main driving wheels forwardly thereof" and insert the same after "chamber" in line 56, same claim; page 5, first column, line 17, claim 10, before the word "transom" insert --a--; and that the said Letters Patent should be read with this correction therein that the same may conform to the record of the case in the Patent Office.

Signed and sealed this 11th day of June, A. D. 1940.

(Seal)

Henry Van Arsdale,
Acting Commissioner of Patents.